(12) United States Patent
Chien et al.

(10) Patent No.: US 7,090,901 B2
(45) Date of Patent: Aug. 15, 2006

(54) METHOD OF MAKING OPTICAL COMPENSATION FILM USING POLYMER STABLIZATION TECHNIQUE

(75) Inventors: Liang-Chy Chien, Hudson, OH (US); Toru Doi, Kuwana Mie (JP)

(73) Assignee: Kent State University, Kent, OH (US)

( * ) Notice: Subject to any disclaimer, the term of this patent is extended or adjusted under 35 U.S.C. 154(b) by 41 days.

(21) Appl. No.: 10/440,379

(22) Filed: May 16, 2003

(65) Prior Publication Data

US 2004/0228983 A1 Nov. 18, 2004

(51) Int. Cl.
*G02F 1/13363* (2006.01)
(52) U.S. Cl. .................. 428/1.3; 428/1.1; 252/299.01; 252/582; 349/86; 349/88; 349/89; 349/117; 349/128
(58) Field of Classification Search ................ 428/1.1, 428/1.3, 1.31, 1.61, 1.33; 349/123, 117, 349/128–129, 74, 10, 86, 88–89, 75, 93; 252/299.5, 299.01, 582
See application file for complete search history.

(56) References Cited

U.S. PATENT DOCUMENTS

| | | | |
|---|---|---|---|
| 4,501,471 A * | 2/1985 | Culley et al. ................ 349/158 |
| 5,473,450 A * | 12/1995 | Yamada et al. ................ 349/84 |
| 5,641,426 A * | 6/1997 | Nerad et al. ........... 252/299.01 |
| 5,668,651 A * | 9/1997 | Yamada et al. ............. 349/156 |
| 5,804,609 A * | 9/1998 | Ohnishi et al. ................ 522/74 |
| 5,863,457 A * | 1/1999 | Hasebe et al. ......... 252/299.01 |
| 5,906,770 A * | 5/1999 | Amundson et al. .... 252/299.01 |
| 6,157,427 A * | 12/2000 | Saynor et al. .............. 349/123 |
| 6,291,035 B1 * | 9/2001 | Verrall et al. ................ 428/1.3 |
| 6,338,902 B1 | 1/2002 | Hsu et al. .................... 428/412 |
| 6,417,902 B1 | 7/2002 | Greenfield et al. ......... 349/115 |

FOREIGN PATENT DOCUMENTS

| | | |
|---|---|---|
| DE | 195 19 928 | 12/1995 |
| EP | 0 992 816 | 4/2000 |
| EP | 1 164 391 | 12/2001 |
| EP | 1 376 163 | 1/2004 |
| GB | 2 394 718 | 5/2004 |
| WO | WO 92/19695 | 11/1992 |
| WO | WO 98/12584 | 3/1998 |
| WO | WO 2004/046774 | 6/2004 |

* cited by examiner

*Primary Examiner*—Harold Pyon
*Assistant Examiner*—Sow-Fun Hon
(74) *Attorney, Agent, or Firm*—Hudak, Shunk & Farine Co. LPA (57) ABSTRACT

The present invention provides a method of preparation of optical compensation films using a polymer stabilization technique so as to enable continuous roll-to-roll production. The films can be applied for reflective liquid crystal displays. They are prepared by photo-polymerizing a mixture comprising a reactive monomer (or mixture of monomers), a small amount of photoinitiator and liquid crystal. The concentration of the reactive monomer (mesogenic or non-mesogenic) in the reactive mixtures can be as low as 5% or as high as 99% by weight. The materials that can function as the optical compensation films in the present invention include, but are not limited to, mixtures of liquid crystal and reactive mesogenic monomers (rod-like, bent-shaped, and disc-like mesogenic monomers) containing polymerizable groups (monofunctionaly or multifunctional) selected from acrylate, methacrylate, vinyls, butadiene, vinyl ethers, or epoxide.

34 Claims, 11 Drawing Sheets

Hybrid alignment

FIG 1. Hybrid alignment

FIG. 2 Relationship between retardation and applied voltage

FIG. 3 Relationship between retardation and applied voltage

FIG. 4 Relationship between retardation and applied voltage

FIG 5. Apparatus and optical configuration for retardation measurement

FIG. 6 Wavelength dependence on transmittance

FIG. 7 Wave length dependence on transmittance

FIG. 8 Wavelength dependence on transmittance

FIG. 9 Wavelength dependence on retardation
Hybrid quarter wave film

FIG. 10

FIG. 11 Wavelength dependence on transmittance
(Comparison between Hybrid ZLI-2806 film and PC film)

FIG. 12 Single-polarizer reflective LCD

FIG. 13 Optical design for reflective LCD

FIG. 14 Optical design for reflective LCD

FIG. 15

FIG. 16 Wavelength dispersion

FIG. 17

FIG. 18 Wavelength dispersion

FIG. 19 Wavelength dispersion

METHOD OF MAKING OPTICAL COMPENSATION FILM USING POLYMER STABLIZATION TECHNIQUE

SUMMARY OF THE INVENTION

The present invention relates to methods of preparing optical compensators using a polymer stabilization technique. Depending on the optical configuration and materials design, the compensators generally comprise a compensation film which is made from a mixture of stabilization polymer and liquid crystal. The film may have the optical retardation properties that can be employed to compensate the asymmetric optical properties of LCDs operating in different modes. The present technique enables the use continuous production methods for the film as a self standing film, or for use in a laminate which can be manufactured on a production scale to enable various end-use applications. More specifically, the compensators use polymer-stabilized liquid crystals to control the optical parameters including the retardation value and wavelength dispersion of retardation. The stabilization polymer provides the guest liquid crystal with suitable processing properties to enable it to be incorporated into the compensation film in production efficient processes. An example of employing the new optical compensator compensated hybrid liquid crystal cells has been demonstrated for reflective liquid crystal displays.

BACKGROUND OF THE INVENTION

Modern liquid crystal displays (LCDs) require radiant color, fast-response time, high contrast, and wide-viewing angle properties as well as high reflectivity for low-power-consumption devices. Compensation films are a vital component for many high performance liquid crystal displays. Specifically, compensation films are designed to make the optical symmetry of the compensators more closely resemble that of the director distribution in the liquid crystal displays. Wide range of compensation films, with optical axis oriented in-plane, titled, or normal to the plane of the film have been developed as achromatic films for STN-LCD and recently, been applied to improve the viewing angle characteristic of TFT-LCD. The optical properties of the retardation films are getting more and more important with an increase in the application field such as reflective LCDs, in which compensation films are used as a quarter wave film to improve the display contrast. It is further envisioned that these applications will expand even further as such films become more readily available and also in increasing sizes.

Conventional optical compensation films are produced from polymer materials such as, stretched polymer films, cast polymer films, or photopolymerized anisotropic polymer films. Stretched polycarbonate quarter wave films or cast polymer films are well-known to have a problem in wavelength dispersion of optical retardation. In practical applications, for example, a film-compensated, normally-white reflective TN at ON state leads to a bluish appearance and the deterioration of optical contrast. Two methods to improve the dispersion property have been proposed: one is the method of combining one or two half wave films with a quarter wave film and the other one is to use special cellulose derivatives as film materials. However, the former approach results in an increase in thickness of the retardation film and to the complexity of the manufacturing process. The latter method still has not yet totally solved the wavelength dispersion problem of retardation compared with that of former method.

Liquid crystal polymer retardation films have been developed for the viewing angle improvement of LCDs. These films are produced either by solution-casting from liquid crystal polymers dissolved in appropriate solvents or photo-polymerizing thin films of rod-like or disc-like liquid crystal monomers on substrates which provide the alignment for the mesogenic monomers, i.e. monomers which contain a mesogenic moiety and one or more polymerizable groups such as, acrylate(s), methacrylate(s), epoxide(s), thio-ene(s), vinyl ether(s), and oxetne(s). The wavelength dispersion property of these anisotropic retardation films is rarely discussed, especially on those successful low wavelength dispersion compensation films. There is a need for a method of fabricating an optical compensation film without the need for stretching, or applying electric or magnetic field which complicates the processing feasibility. Further, the method needs to be capable of fabricating large-sized films with high yield, such as meter-wide, roll-to-roll continuous process films.

Polymer stabilization is a unique technique to stabilize the molecular conformation by polymer network in which a heterogenous phase separated composite is formed with a matrix of the stabilization polymer and discrete domains of the guest liquid crystal, or vice verse, depending on the relative ratio of the two phases. In general, the polymer network is produced by photo-polymerization of an appropriate amount of reactive molecules in a liquid crystal phase. The amount selected may depend on the processing parameters which are selected, but generally will be from about 3 to about 99%, more preferably about 5 to about 95%, or about 5 to about 80%, or even about 60% by weight of the reactive monomer(s) with the weight percent remainder being the liquid crystal, and the percentages based on weight percent. This technique has been successfully applied to produce LC/polymer composites which are believed to primarily be phase separated, heterogenous composites, with unique structures or optical properties. Further this technique has led to the development of various displays such as, light scattering LCDs, bi-stable reflective cholesteric displays, and threshold-less ferroelectric displays. "Bi-stable" is used here in its generally accepted meaning, i.e. having two different optical states such as a dark and a bright state which are stable without requiring an externally applied field.

DETAILED DESCRIPTION OF THE INVENTION

The present invention provides a method of preparation of optical compensation films using a polymer stabilization technique so as to enable continuous roll-to-roll production as a self-supporting film or as a painted-on layer within a laminate. The present invention also provides an example of applying the optical compensator for reflective liquid crystal displays. The optical compensation films are prepared by photo-polymerizing a mixture comprising a reactive monomer (or mixture of monomers), a small amount of photo-initiator and liquid crystal. The concentration of the reactive monomer (mesogenic or non-mesogenic) in the reactive mixtures can be as low as 3% or as high as 99% by weight. The materials that can function as the optical compensation films in the present invention include, but are not limited to, mixtures of liquid crystal and reactive mesogenic monomers (rod-like, bent-shaped, and disc-like mesogenic monomers) containing polymerizable groups (monofunctionaly or multifunctional) selected from acrylate, methacrylate, vinyls, butadiene, vinyl ethers, oxetane, or epoxy. The reactive monomer changes its structure during the polymerization, such as the transformation from a double bond to a single bond or from a ring structure to a ring-opening structure.

Figure 20:
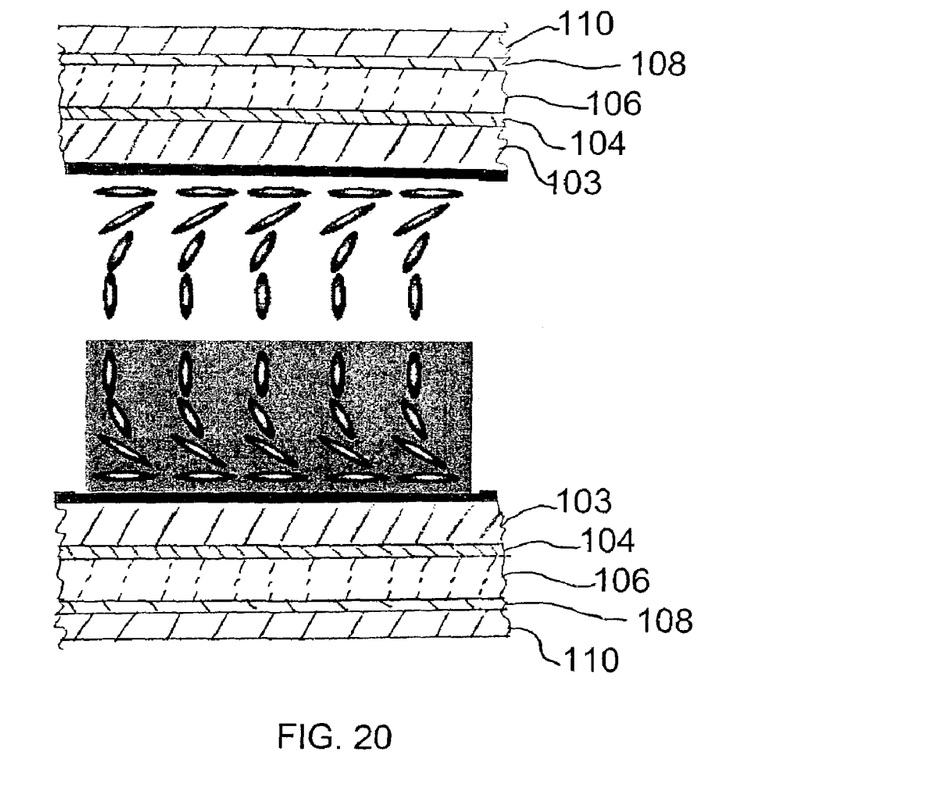
FIG. 20 is a cross-sectional representation of a first laminate film using the optical compensation film of the present invention.
Figure 21:
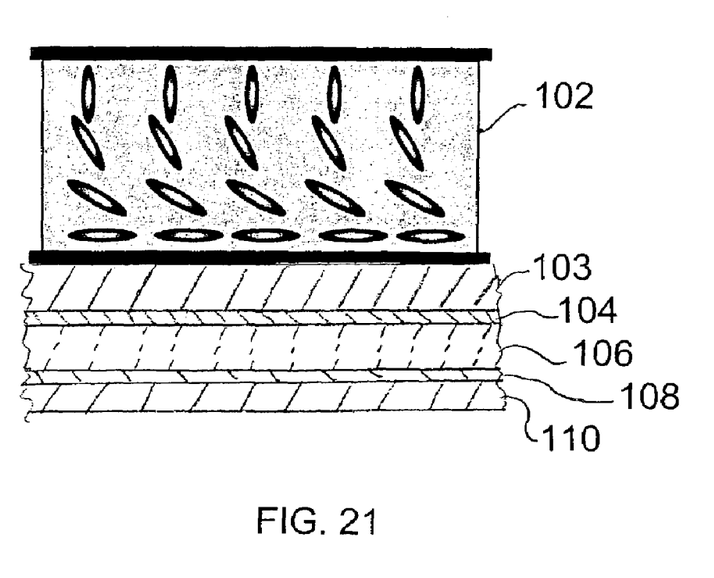
FIG. 21 is a cross-sectional representation of a second laminate film using the optical compensation film of the present invention.

The present invention also relates to a process for the production of a compensation film. In the past, the processing limitations of liquid crystals have interfered with production of optical compensation films at any substantial scale. In the present invention, the use of a polymer allows the films to be manufactured at a significant size, such as a meter wide roll, using continuous production techniques such as roll to roll production of a self-supporting film, or painted-on processes, in which the film is doctored onto a supporting substrate. The monomers and guest liquid crystals are mixed, preferably with spacers, with a solvent to form a heterogenous mixture which is formed into a film which is used for optical compensation. The compensation film 100 can be laminated including the spacers 102 as is shown in FIGS. 20 and 21 with various layers including an indium tin oxide layer 104, a tac layer 106, a psa (such as butadiene or butyl rubber) layer 108, and a wax film, or release film 110. The compensation film is generally from about 0.5 to about 100 microns, preferably about 0.5 to about 50 microns, and most preferably about 1 to about 25 or 20 microns, in thickness depending on the desired value of retardation. The film can have one or more orientation layer, such as a planner and/or a homeotropic orientation layer as is known in the art. Generally, the film is cured by radiation, such as UV radiation following production/lamination of the various layers. The process is conducted under production type conditions, at ambient pressure and temperature, in air, although for manufacturing quality a clean room environment may be desirable.

Figure 5:
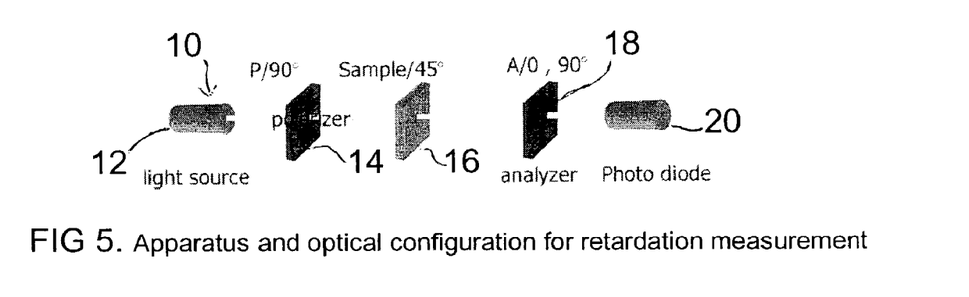
FIG. 5 is a schematic representation of an apparatus and optical configuration for retardation measurement.
Figure 10:
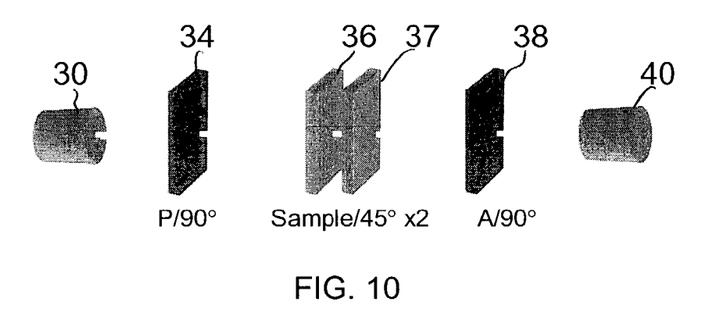
FIG. 10 is a schematic representation of an apparatus and optical configuration for retardation measurement using two samples at 45°.
Figure 12:
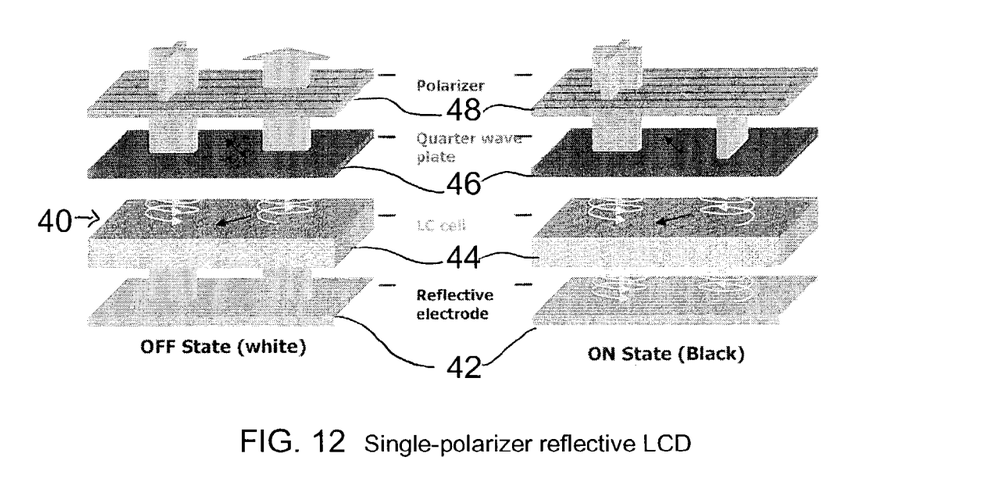
FIG. 12 is a schematic representation of a single polarizer reflective liquid crystal diode.
Figure 13:
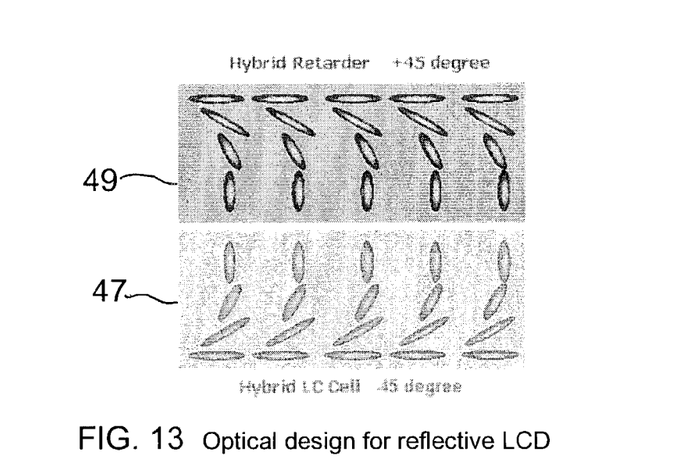
FIG. 13 is a schematic representation of a laminate of a hybrid retarder and a hybrid liquid crystal cell.
Figure 15:
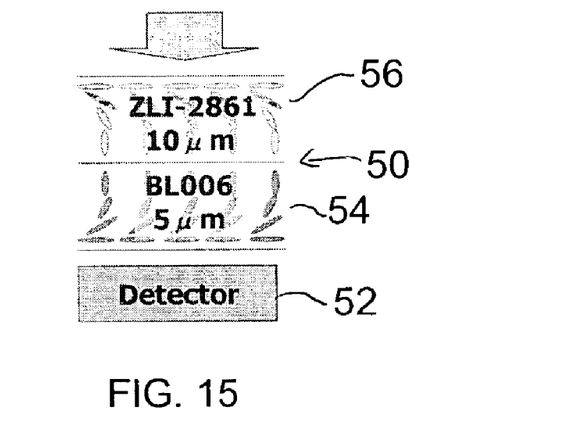
FIG. 15 is a schematic representation of a laminate of a hybrid retarder and a hybrid liquid crystal cell using ZLI2861 and BL006.
Figure 17:
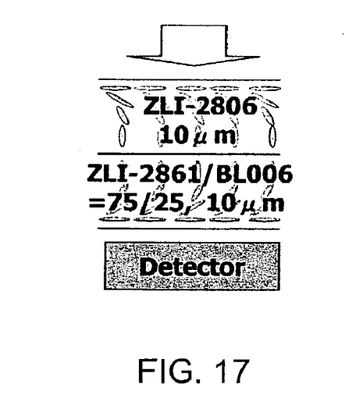
FIG. 17 is a schematic representation of a laminate of a hybrid retarder and a hybrid liquid crystal cell using ZLI2806, and a hybrid of ZLI2861 and BL006.
Figure 18:
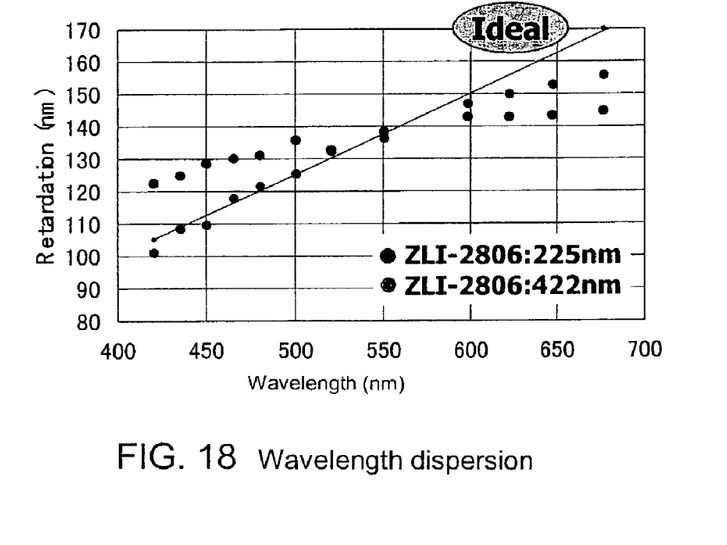
FIG. 18 is a plot of the retardation versus the wavelength for the cell of FIG. 17.
Figure 19:
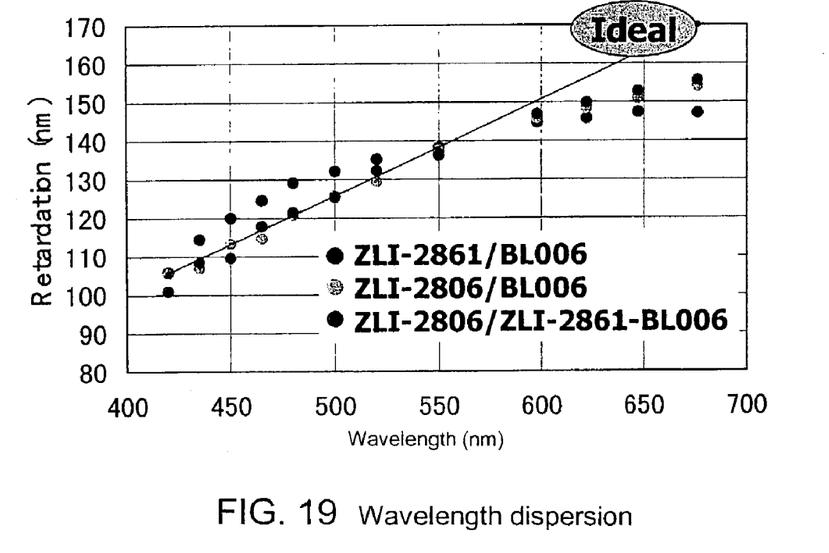
FIG. 19 is a plot of wavelength dispersion for the three previous cells.

FIG. 5 shows an apparatus 10 and optical configuration for retardation measurement having a light source 12, a polarizer 14, a compensation sample 16, an analyzer 18 and a photo diode 20. FIG. 10 shows a similar apparatus 30 with a light source 32, a polarizer 34, two compensation sample 36,37, an analyzer 38, and a photo diode 40. FIG. 12 illustrates a single polarizer reflective LCD with a reflective electrode 42, which is used like a mirror, a liquid crystal cell 44, a quarter wave film, or plate 46, and a polarizer 48. FIG. 13 illustrates a compensation cell with two layers, the first 47 is a hybrid liquid crystal cell, and the second 49 is a hybrid retarder, or compensation film. FIGS. 15 and 17 illustrate similar cells, with specifically defined layers of liquid crystal.

SPECIFIC EMBODIMENTS OF THE INVENTION

Figure 1:
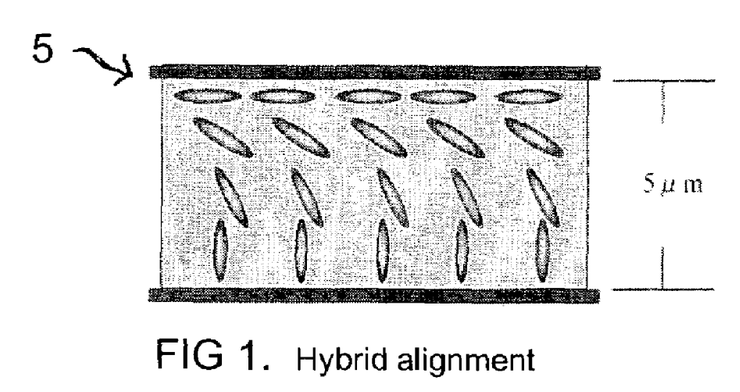
FIG. 1 is a schematic representation of a compensation film in accordance with the present invention showing hybrid alignment.

The optical compensators are prepared by the polymer stabilization of mixtures of liquid crystals and reactive mesogenic monomers with their optical axis spatially-arranged in between two substrates. The substrates with alignment for planar and hybrid alignment (plan to homeotropic alignment from the top to bottom substrate) have been made and are illustrated generally at 5 in FIG. 1 and the resultant films have been used for improving the optical properties of liquid crystal displays. The examples presented below illustrate the preparation of hybrid-type quarter wave films and reflective liquid crystal displays containing the optical compensator.

1. Preparation of Quarter Wave Films (QWFs)

The mesogenic monomers used in this invention are rod-like monomers of mono and bi-functional mesogenic acrylates shown as reactive liquid crystals A, B, and C set forth below.

Figure 2:
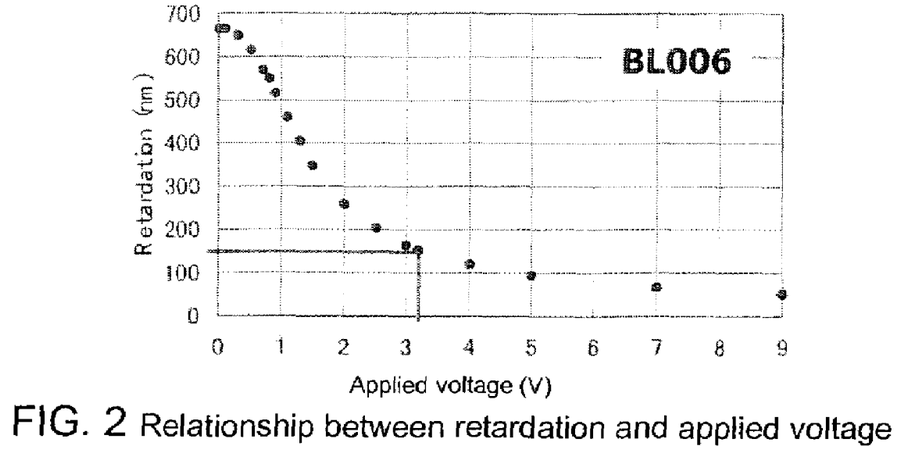
FIG. 2 is a plot showing the relationship between retardation and applied voltage for liquid crystal BL006.

Hybrid-type quarter wave films were prepared by use hybrid cells with two substrates—one substrate has an inward facing surface treated for homeotropic alignment and the other substrate has an opposing inward facing surface treated for planner alignment. The substrates are separated with 5 micron spacers as shown in FIG. 2. The homeotropic alignment is obtained by spin-coating a commercially available polyimide (or a rigid polymer) containing long alkyl (i.e. <than $C_{12}$ hydrocarbon) side chains and baking the film after coating to remove the residual solvent. The planner alignment is obtained by spin-coating a commercially available polyimide acid (or a rigid polymer), baking the film to remove the residual solvent from the imide structure and rubbing the film uniaxially. Three liquid crystal mixtures (BL006, ZLI-2861 and ZLI-2806, Merck, and shown in FIG. 1 as A,B, and C respectively) were used as the guest LCs, which have different physical properties as is shown in Table 1.

TABLE 1

Physical properties of liquid crystal mixtures

| Grade | Clearing point | $n_e$ | $n_o$ | $\Delta n$ | $\epsilon_{para}$ | $\epsilon_{perp}$ | $\Delta \epsilon$ |
|---|---|---|---|---|---|---|---|
| BL006 | 113 | 1.816 | 1.530 | 0.286 | 22.8 | 5.5 | 17.3 |
| ZLI2861 | 94 | 1.623 | 1.498 | 0.125 | 8.5 | 3.3 | 5.3 |
| ZLI2806 | 100 | 1.518 | 1.474 | 0.044 | 3.3 | 8.1 | −4.8 |

Figure 3:
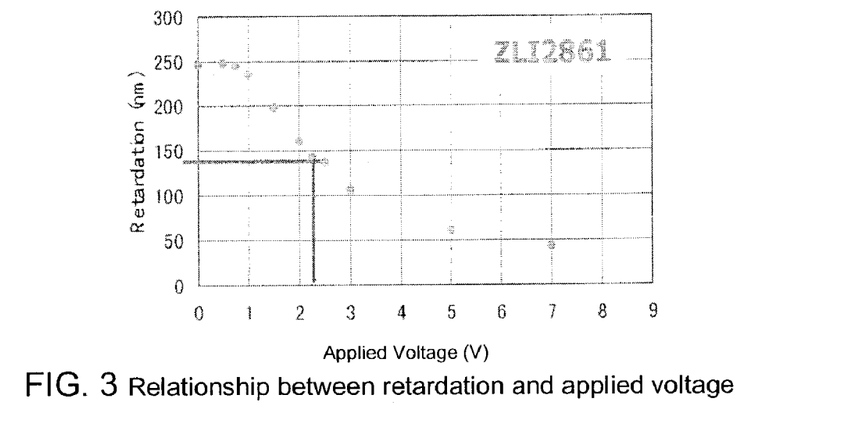
FIG. 3 is a plot showing the relationship between retardation and applied voltage for liquid crystal ZLI2861.
Figure 4:
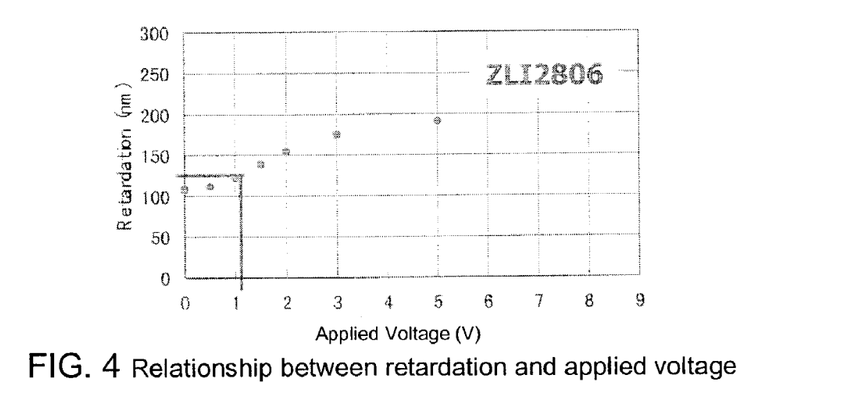
FIG. 4 is a plot showing the relationship between retardation and applied voltage for liquid crystal ZL 2806.

The significance of these guest LCs is the difference in their optical birefringence. BL006 has the highest optical birefringence, ZLI-2806 is the lowest in optical birefringence, and ZLI 2861 is in between the two others. The retardation of the samples was controlled electrically to 137.5 nm which corresponds to quarter wave length for yellow light (550 nm). Specifically, the samples were sandwiched in between two substrates with conductive electrodes coated at the inner surfaces, which allows the user to tune the orientation of the LC, and thus, the optical retardation. Yellow light wavelength is an industrial standard, which is in the middle of the visible spectrum. The relationships between retardation and applied voltage for BL006, ZLI3861 and ZLI-2806 were shown in FIGS. 3–5, respectively. A typical formula containing 95 mg of guest LC, 5 mg of mesogenic monomer RM257 (Merck, formula A from formula 1, and 0.3 mg of Irgacure651 (Ciba Additive) as a photo-initiator was dissolved in dichloromethane and the solvent, dichloromethane, is used to dissolve the LC and mesogenic monomer to form a homogenous mixture, and subsequently was evaporated under reduced pressure to give a homogeneous liquid crystal mixture at room temperature. The resulting liquid crystal mixture was poured into a hybrid cell and the retardation of the cell was controlled to 137.5 nm which corresponds to quarter of the wavelength for yellow light (550 nm). In case a cell with surfaces treated for anti-parallel alignment is used, the retardation of the cell was electrically controlled to 137.5 nm which corresponds to quarter of the wavelength for yellow light (550 nm). Photopolymerization was carried out by ultraviolet light irradiation for 30 minutes (at 365 nm, 0.4 mW/cm$^2$). The retardation value was the same after polymerization as before polymerization and the retardation value was confirmed to be constant over one month.

The stability of optical retardation is very important for optical retardation films. The effect of the concentration and structure of the reactive liquid crystals on the stability was examined by measurement of the retardation change before and after polymerization, and after removal of the electric field. The effect of concentration of reactive liquid crystal on the stability was evaluated using reactive monomer A of FIG. 1. The results were summarized in Table 2.

TABLE 2

Effect of monomer concentration on stability

| Monomer Conc. | Before polvmn. | Retardation | | | |
|---|---|---|---|---|---|
| | | After polymn | | | |
| | | 10 V | 0 V | | |
| | 10 V | | 0 min | 30 min | 1 day |
| 5% | 137 | 112 | 114 | 121 | 121 |
| 20% | 144 | 118 | 118 | 112 | 115 |
| 40% | 172 | 137 | 139 | 137 | 144 |
| 80%* | 192 | 221 | 221 | 222 | 232 |

(A)/BL006/Irg651, 10 μm anti-parallel cell, Polymn. for 30 min.
*high viscosity

A slight retardation change was observed before and after polymerization in all cases, meaning that the conformational change occurs during the polymerization. Once polymerized, the retardation was confirmed to be constant after removing the applied field. It was found that 5% of reactive LC sufficed for the stabilization of the retardation.

EXAMPLE 2

The effect of the structure of reactive LCs on the stabilization was evaluated. The results were summarized in Table 3.

TABLE 3

Effect of monomer structure on stability

| Monomer | Before polymn. 10 V | After polymn 10 V | After polymn 0 V 0 min | After polymn 0 V 10 min | After polymn 0 V 30 min | After polymn 0 V 1 day |
|---|---|---|---|---|---|---|
| A | 111 | 112 | 126 | 124 | 123 | 125 |
| B | 101 | 92 | 108 | 113 | 114 | 159* |
| C | 109 | 118 | 206 | 218 | 228 | 261 |

Reactive LC/ZLI2861/Irg651 = 5/95/0.2 Polymn. for 30 min.
*Hazy

The retardation value was increased slowly when monoacrylate LC (B) was used as a reactive-LC. The retardation was increased steeply after removing the applied voltage in case of mono-acrylate LC (C) with alkyl spacer. The di-acrylate LC (A) showed an excellent stability of retardation. The stabilization ability decreased with the following order: LC monomer A>LC monomer B>LC monomer C (with spacer). This result may indicate that bi-functional monomers may be preferred over mono acrylates, since they provide more reactive sites, and further that a mixture of bi- or multi-functional monomers with mono functional monomers will also give good results. The choice of the LC monomers used may also be based upon the desired retardation and the processability characteristics.

EXAMPLE 3

Hybrid type quarter wave films were prepared by use of hybrid cells with 5 micron thickness. The retardation stabilization of the hybrid configuration was checked using the method set forth above and the results are summarized in Table 4.

TABLE 4

Stability of retardation

| | Before polymn. 0 V | After polymn 2.5 V | After polymn 2.5 V | After polymn 0 V 0 min | After polymn 0 V 30 min | After polymn 0 V 1 day | After polymn 0 V 1 month |
|---|---|---|---|---|---|---|---|
| Hybrid type | 296 | 141 | 139 | 139 | 143 | 141 | 140 |

ZLI2861/(A)/Irg651 = 95/5/0.3, 5 μm Hybrid cell, Polymn. for 30 min. λ = 633 nm.

The retardation value was the same before and after polymerization and the retardation value was confirmed to be constant over one month.

2. Wavelength Dispersion Properties of the Quarter Wave Films

Figure 6:
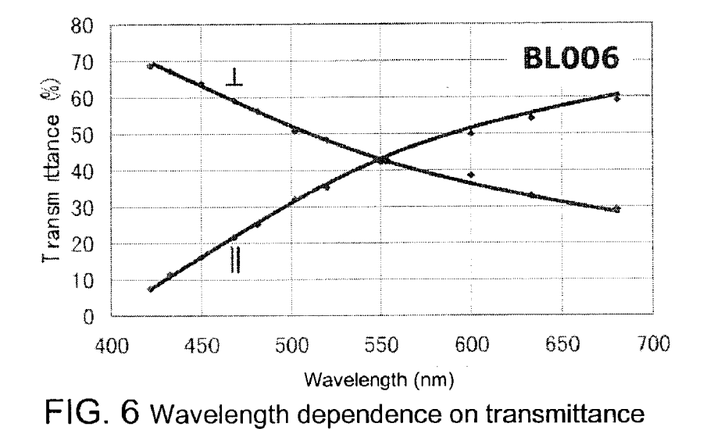
FIG. 6 is a plot of the wavelength dependence on transmittance for hybrid film using liquid crystal BL006
Figure 7:
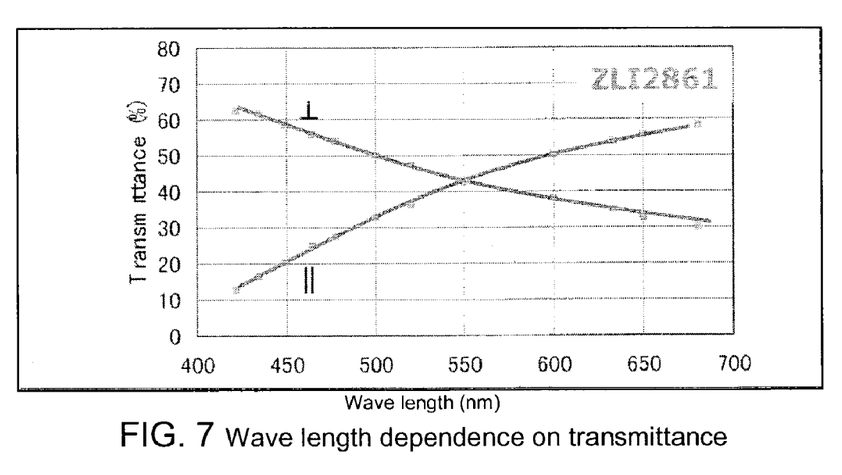
FIG. 7 is a plot of the wavelength dependence on transmittance for hybrid film using liquid crystal ZLI2861.
Figure 8:
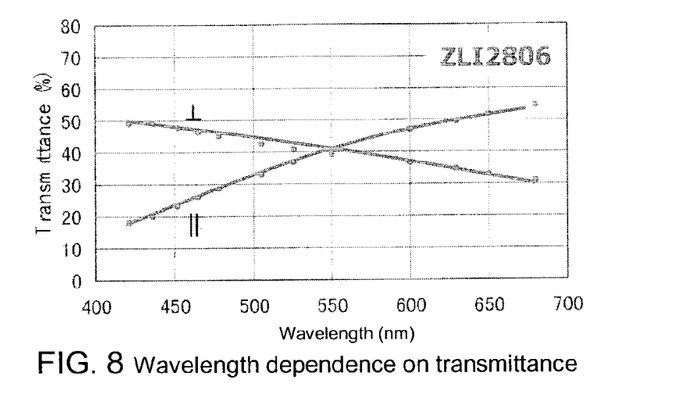
FIG. 8 is a plot of the wavelength dependence on transmittance for hybrid film using liquid crystal ZLI2806.
Figure 9:
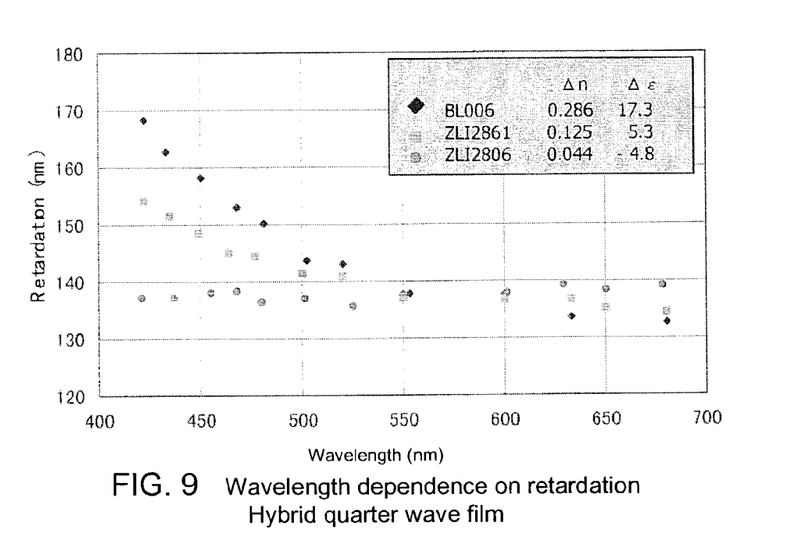
FIG. 9 is a plot of the wavelength dependence on retardation for hybrid film using liquid crystals BL006, ZLI2861, and ZLI2806.

Wavelength dispersion properties of three hybrid-type quarter wave films with different liquid crystal mixtures as the guest molecules were evaluated. The apparatus and optical configuration for the measurement is illustrated in FIG. 5, in which the optical axis of the quarter wave film is arranged at 45° with respect to the polarizer. The apparatus is shown generally at 10 in FIG. 5 and is comprised of a light source 12, a polarizer 14 at 90°, the sample at 45°, an analyzer at 90°, and a photo diode. The wavelength dependence of transmittance of the three samples, named as BL006, ZLI-2861 and ZLI-2806, was determined and shown in FIGS. 6–8, respectively. The wavelength dependence of retardation was calculated using the following equation:

$$R = \Delta n d = \lambda [\sin^{-1}(I_\perp / I_\circ)^{1/2}]/\pi$$

where R is the retardation, $\Delta n$ is the optical birefringence of the film, d is the thickness of birefringence film, $\lambda$ is the wavelength of light, $I_\perp$ is the output light intensity after crossed polarizers, and $I_\circ$ is the output light intensity after parallel polarizers. The results of calculation are shown in FIG. 9. The wavelength dependence of retardation was found to decrease following the order of BL006>ZLI-2806 (the order is corresponding to the decreasing in $\Delta n$ of the guest). When ZLI-2806 (which has the lowest $\Delta n$ and negative $\Delta \epsilon$ as set forth in Table 1) was used as a guest liquid crystal, the retardation value of the resulting film was found to be constant (wavelength independent) over the optical range (400~700 nm, the whole visible range).

Figure 11:
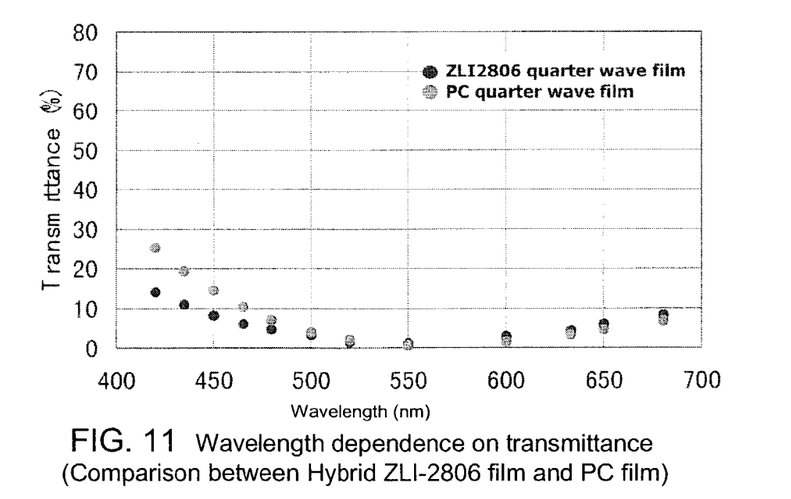
FIG. 11 is a plot of wave length dependence on transmittance comparing hybrid ZLI2806 film and PC film.

FIG. 10 shows the transmittance vs. wave length of the hybrid of the present invention and stretched polycarbonate films. The hybrid quarter wave film showed an improvement in light leakage in the wavelength region compared to that of the stretched polycarbonate quarter wave film. However, there is still room for improvement for the light leakage in case of the use of hybrid quarter film. The ideal optical compensation films should exhibit reversed dispersion. To achieve this goal, we further tested the applications of the new quarter wave films by using combined hybrid film with hybrid liquid crystal cell as described below. FIG. 11 is a comparison of the wavelength dependence on transmittance between Hybrid ZLi-2806 film and PC film.

3. Application of Hybrid Compensator to Normally-white Single Polarizer Reflective LCD 1.1 Single-polarizer Reflective LCD The optical configuration of a single-polarizer reflective LCD is shown generally at 40 in both the off state (white) and the on state (black) in FIG. 12. This apparatus includes a reflective electrode 42, a liquid crystal cell 44, a quarter wave plate 46 and a polarizer 48. In a normally-white, single polarizer reflective LCD, the optical axis of hybrid compensator is configured to be perpendicular to that of the hybrid LC cell. At the white state (Off state), the retardation of the retardation of LC cell is compensated by the hybrid retardation film. As the result, the linear polarized light shines through above the polarizer and reflects on the mirror, i.e. the reflective electrode, as that shown in FIG. 12 and the reflected light transmits through the polarizer. At the black state, the linear polarized light is converted to circular light by the retardation caused by the of hybrid retardation film, and then reflects on the mirror. The reflected circular light is converted to linear polarized light with 90 degree rotated and it is shielded by the polarizer above the quarter wave plate. The wave length dispersion of the retardation film and LC cell is very important to obtain pure white and black to give excellent contrast.

1.2 Optical Design for Reflective LCD

It is easy to use a polymer stabilized retardation film to control the optical parameters such as, the retardation value and wavelength dispersion of retardation by selecting the suitable guest liquid crystal. We designed a high performance reflective LCD combined hybrid retardation films with a hybrid LC cell shown in FIG. 12 which has fast response time. The optical compensation principle is illustrated in FIG. 13. We select, at the black state, the difference in retardation between the retardation film and LC cell (Retardation film—LC cell) equal to ¼ wave length; at the white state, the retardation film is equal to LC cell (Retardation film=LC cell); and the wavelength dispersion of the Retardation film is far smaller than that of the LC cell.

3.3 Optical Properties of Hybrid Retardation Film/Hybrid LC Cell System

EXAMPLE 4

Hybrid Retardation Film (ZLI-2861)Hybrid LC cell (BL006) System

Figure 14:
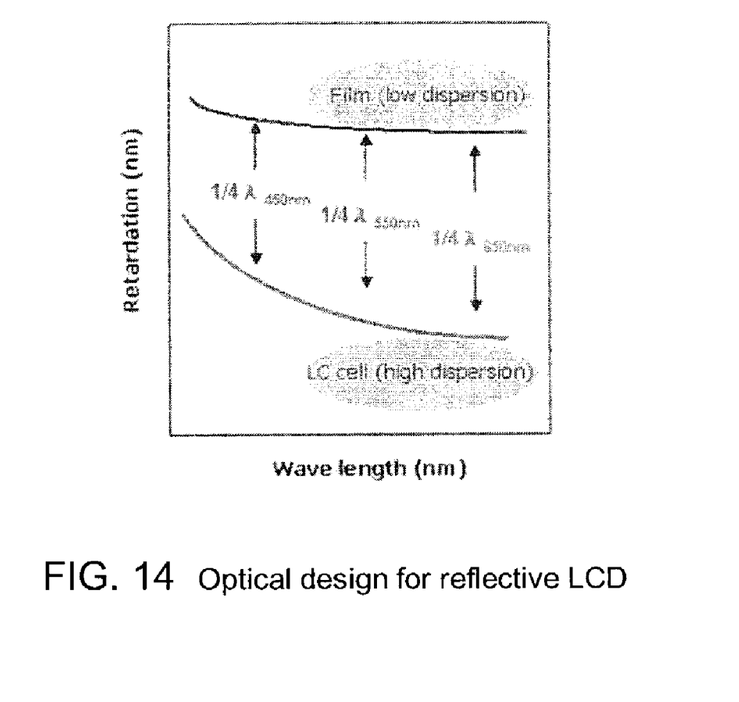
FIG. 14 is a plot of the retardation versus the wavelength for the cell of FIG. 13.

From the criteria of optical design listed above, ZLI-2861 (medium wavelength dispersion, 10-micron film) and BL006 (high wave length dispersion) were used for hybrid retardation film and hybrid LC cell, respectively. The wave length dispersion at black state was evaluated. FIG. 14 shows the wavelength dependence on retardation at black state, the black line shows the dispersion line for an ideal compensation film. It was found that reversed wave length dispersion could be obtained using the combined hybrid film and cell shown in FIG. 15 at 50, and comprised of a detector 52, a first hybrid polymer stabilized compensation film 54 and a second hybrid stabilized compensation film 56. In this example, the first film uses BL006 as the guest LC, and ZLI 2861 as the second guest LC. Furthermore, the dispersion characteristic becomes closer to the ideal one in the short wavelength region to optimize the retardation value of the retardation film. However, the deviation from the ideal line was observed in the long wavelength region, because the wavelength of dispersions of ZLI-2861 and BL006 in the high wavelength region was almost the same.

EXAMPLE 5

Hybrid Retardation Film (ZLI-2806)/Hybrid LC Cell (BL006)

Figure 16:
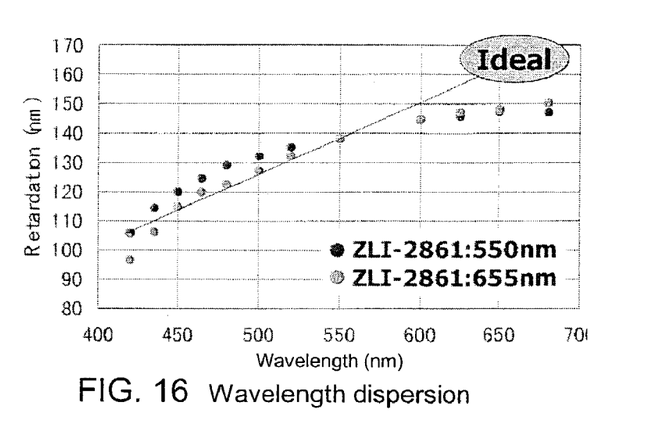
FIG. 16 is a plot of the retardation versus the wavelength for the cell of FIG. 15.

A similar experiment was carried out by using ZLI-2806 (low wavelength dispersion, 10-micron film) as a guest LC for hybrid retardation film. FIG. 16 shows the wavelength dependence of retardation for the film-compensated reflective display. Once again the device is that shown in FIG. 15 except that the first compensation film uses a combination of ZLI 2862 and BL006, and the second film uses ZLI 2806. The dispersion characteristic gives much better agreement with the ideal line (the ideal compensation films) in the whole wavelength region in comparison with the combination of medium wavelength dispersion film and high wave dispersion cell (Example 4).

EXAMPLE 6

Hybrid Retardation Film (ZLI-2806)/Hybrid LC Cell (BL006/ZLI-2861)

The effect of the optical property of hybrid LC cell on the wave length dispersion was further examined by using a mixture of BL006/ZLI-2861 (25/75 wt %). FIG. 17 shows the result, in comparison with those of ZLI-2861/BL006 and ZLI-2806/BL006, of wavelength dispersion of retardation. The wavelength dispersion gives almost the same agreement with that of ZLI-2806/BL006 which is better than that of ZLI-2861/BL006. This means that the lower wavelength dispersion of the retardation film is more important to get an ideal black state.

What is claimed is:

1. An optical compensation film product comprising the polymerization product of a mixture of about 20 to about 95% by weight of a liquid crystal and about 5 to about 80% by weight of one or more reactive mesogenic monomers selected from the group consisting of acrylate, methacrylate, vinyl, butadiene, vinyl ether, oxetane, and epoxide, the weight percentage being based on the total weight of the liquid crystal and the monomer or monomers, and the liquid crystal is non-reactive with the monomer or monomers which are polymerized to make the host polymer; wherein the optical axis of the liquid crystal is aligned planar to homeotropic from the top to the bottom of the optical compensation film product.

2. An optical compensation film product as set forth in claim 1 wherein the polymerization is a photopolymerization.

3. An optical compensation film product as set forth in claim 2 wherein the photopolymerization is initiated by the application of ultra-violet light.

4. An optical compensation film product as set forth in claim 1 wherein the polymerization product is a film comprising a layer of a laminate.

5. An optical compensation film product as set forth in claim 4 wherein the laminate further comprises a layer of a pressure sensitive adhesive.

6. An optical compensation film product as set forth in claim 4 wherein the laminate further comprises a layer of indium tin oxide.

7. An optical compensation film product as set forth in claim 4 wherein the laminate further comprises an orientation layer.

8. An optical compensation film product as set forth in claim 4 wherein the film is from about 0.5 to about 20 microns in thickness.

9. An optical compensation film product as set forth in claim 1 wherein the polymerization product is a production scale roll of film.

10. An optical compensation film product as set forth in claim 9 wherein the film is from about 0.5 to about 50 microns in thickness.

11. An optical compensation film product as set forth in claim 1 wherein the film is from about 1 to about 25 microns in thickness.

12. An optical compensation film product as set forth in claim 1 wherein the amount of the reactive monomer is from about 5 to about 60%.

13. An optical compensation film product as set forth in claim 1 wherein the mixture further comprises spacers.

14. An optical cell including an optical compensation layer comprising a composite having a host polymer and a guest liquid crystal, wherein the liquid crystal comprises from about 20 to about 40% by weight, and the host polymer comprises from about 5 to about 60% by weight, and is the polymerization product of one or more reactive mesogenic monomers selected from the group consisting of acrylate, methacrylate, vinyl, butadiene, vinyl ether, oxetane, and epoxide, the weight percentage being based on the total weight of the liquid crystal and the monomer or monomers, and the liquid crystal is non-reactive with the monomer or monomers which are polymerized to make the host polymer; wherein the optical axis of the liquid crystal is aligned planar to homeotropic from the top to the bottom of the optical compensation layer.

15. An optical cell as set forth in claim 14 wherein the composite further includes spacers.

16. An optical cell as set forth in claim 14 wherein the reactive monomer is multifunctional.

17. An optical cell as set forth in claim 14 which includes more than one layer of optical compensation film layer.

18. A reflective liquid crystal display, which has a passive optical compensator comprising a film laminate, comprising an optical compensation film layer having a first surface and a second surface, which is a composite having a host polymer and a guest liquid crystal, wherein the liquid crystal comprises from about 20 to about 95% by weight, and the host polymer comprises about 5 to about 80 by weight, and is the polymerization product of one or more reactive mesogenic monomers selected from the polymerizable group consisting of acrylate, methacrylate, vinyl, butadiene, vinyl ether, oxetane, and epoxide, the weight percentage being based on the total weight of the liquid crystal and the monomer or monomers, wherein the liquid crystal is non-reactive with the monomer or monomers which are polymerized to make the host polymer, and the optical axes of the host polymer and the guest liquid crystal are spatially arranged for planar to homeotropic alignment between the first surface and the second surface.

19. A reflective liquid display as set forth in claim 18 wherein the composite further includes spacers.

20. A reflective liquid display as set forth in claim 18 wherein the reactive monomer or monomers is multifunctional.

21. A reflective liquid display as set forth in claim 18 which includes more than one layer of optical compensation film layer.

22. A roll of optical compensation film having a width of at least a meter, which is self supporting, or is a laminate with a support layer, comprising a film layer which is a composite having a host polymer and a guest liquid crystal, wherein the liquid crystal comprises from about 20 to about 95% by weight, and the host polymer comprises from about 5 to about 80 by weight, and is the polymerization product of one or more reactive mesogenic monomers selected from the polymerizable group consisting of acrylate, methacrylate, vinyl, butadiene, vinyl ether, oxetane, and epoxide, the weight percentage being based on the total weight of the liquid crystal and the monomer or monomers, and the liquid crystal is non-reactive with the monomer or monomers which are polymerized to make the host polymer; wherein the optical axis of the liquid crystal is aligned planar to homeotropic from the top to the bottom of the film layer.

23. A roll of optical compensation film as set forth in claim 22 wherein the film is from about 0.5 to about 50 microns in thickness.

24. A roll of optical compensation film as set forth in claim 23 wherein the film is from about 1 to about 25 microns in thickness.

25. A roll of optical compensation film as set forth in claim 24 wherein the film is from about 1 to about 20 microns in thickness.

26. A roll of optical compensation film as set forth in claim 22 wherein the amount of the reactive monomer is from about 5 to about 60%.

27. A roll of optical compensation film set forth in claim 22 wherein the composite further comprises spacers.

28. A passive optical compensation film product comprising an optical compensation layer which is the polymerization product of a mixture of about 20 to about 95% by weight of a liquid crystal and about 5 to about 80 % by weight of one or more reactive mesogenic multifunctional monomers selected from the group consisting of acrylate, methacrylate, vinyl, butadiene, vinyl ether, oxetane, and epoxide, the weight percentage being based on the total weight of the liquid crystal and the monomer or monomers, and the liquid crystal is non-reactive with the monomer or monomers which are polymerized to make the host polymer, and the polymerization product is a film which is from about 0.5 to about 50 microns in thickness, wherein the optical axis of the liquid crystal is aligned planar to homeotropic from the top to the bottom of the film; and the optical compensation layer comprises a layer of a laminate which further includes an orientation layer, a layer of a pressure sensitive adhesive and a release layer.

29. A passive optical compensation film product as set forth in claim 28 wherein the composite further includes spacers.

30. A passive optical compensation film product as set forth in claim 28 wherein the film is from about 1 to about 25 microns in thickness.

31. A passive optical compensation film product as set forth in claim 28 wherein the film is from about 0.5 to about 22 microns in thickness.

32. A passive optical compensation film product as set forth in claim 28 wherein the amount of reactive monomer is from about 5 to about 60% by weight.

33. A passive optical compensation film product as set forth in claim 28 wherein the film is from about 1 to about 25 microns in thickness.

34. A passive optical compensation film product as set forth in claim 28 wherein the film product comprises more than one optical compensation layer.

\* \* \* \* \*